(12) United States Patent
Iwamoto

(10) Patent No.: US 8,848,089 B2
(45) Date of Patent: Sep. 30, 2014

(54) IMAGE PROCESSING APPARATUS AND RECORDING MEDIUM

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 260 days.

(21) Appl. No.: 12/960,670

(22) Filed: Dec. 6, 2010

(65) Prior Publication Data
US 2011/0141305 A1    Jun. 16, 2011

(30) Foreign Application Priority Data

Dec. 16, 2009   (JP) ................................ 2009-284829

(51) Int. Cl.
| | | |
|---|---|---|
| *H04N 5/76* | (2006.01) | |
| *H04N 5/222* | (2006.01) | |
| *G11B 27/10* | (2006.01) | |
| *H04N 9/82* | (2006.01) | |
| *H04N 21/4223* | (2011.01) | |
| *H04N 21/431* | (2011.01) | |
| *H04N 5/232* | (2006.01) | |
| *H04N 21/45* | (2011.01) | |
| *H04N 21/4402* | (2011.01) | |
| *G06F 17/30* | (2006.01) | |
| *H04N 1/00* | (2006.01) | |
| *H04N 5/77* | (2006.01) | |
| *H04N 21/81* | (2011.01) | |
| *G11B 27/32* | (2006.01) | |
| *H04N 9/87* | (2006.01) | |
| *G11B 27/34* | (2006.01) | |
| *H04N 101/00* | (2006.01) | |

(52) U.S. Cl.
CPC .............. *H04N 5/232* (2013.01); *G11B 27/105* (2013.01); *H04N 2201/3253* (2013.01); *H04N 9/8205* (2013.01); *H04N 21/4223* (2013.01); *H04N 21/4312* (2013.01); *H04N 2201/3201* (2013.01); *H04N 21/4524* (2013.01); *H04N 21/440263* (2013.01); *G06F 17/30274* (2013.01); *H04N 1/00442* (2013.01); *H04N 5/772* (2013.01); *H04N 21/4314* (2013.01); *H04N 2201/3274* (2013.01); *H04N 2201/3273* (2013.01); *H04N 1/00453* (2013.01); *H04N 2201/325* (2013.01); *H04N 5/23293* (2013.01); *H04N 21/8153* (2013.01); *G11B 27/329* (2013.01); *H04N 9/8715* (2013.01); *H04N 2101/00* (2013.01); *G11B 27/34* (2013.01)
USPC ............... 348/333.05; 348/333.02; 348/231.3

(58) Field of Classification Search
USPC ...................................................... 348/333.05
See application file for complete search history.

(56) References Cited

U.S. PATENT DOCUMENTS

| | | | | |
|---|---|---|---|---|
| 5,488,558 | A | * | 1/1996 | Ohki ........................ 348/E5.025 |
| 6,023,241 | A | * | 2/2000 | Clapper .................... 342/357.32 |

(Continued)

FOREIGN PATENT DOCUMENTS

| | | |
|---|---|---|
| JP | 8-068649 A | 3/1996 |
| JP | 2004-272217 A | 9/2004 |

(Continued)

OTHER PUBLICATIONS

Japanese Office Action dated Dec. 13, 2011 (and English translation thereof) in counterpart Japanese Application No. 2009-284829.

(Continued)

*Primary Examiner* — Sinh Tran
*Assistant Examiner* — Jason Flohre
(74) *Attorney, Agent, or Firm* — Holtz Holtz Goodman & Chick PC

(57) ABSTRACT

Without depending on the conventional standard, relationships between a location of user's apparatus and locations where images have been shot affect a display on a display screen. In shooting operation, image data is stored in a memory with image-location data added, which represents locations where images have been shot (step S110). When the user of a digital camera moves from a current location, vectors are calculated, having an initial point at the current location and terminal points at locations represented by image-location data of the image data (step S113). It is judged whether any vector projects from a display target region (display screen) (step S117). The vector projecting from the region is adjusted to fall within the region (step S118), whereby all the thumbnail images fall within the display target region and are displayed at locations represented by the image-location data within a marginal displaying region (step S120).

14 Claims, 17 Drawing Sheets

(56) References Cited

U.S. PATENT DOCUMENTS

| | | | | |
|---|---|---|---|---|
| 6,133,947 | A | * | 10/2000 | Mikuni .................. 348/143 |
| 6,437,797 | B1 | * | 8/2002 | Ota ..................... 348/231.5 |
| 6,507,371 | B1 | * | 1/2003 | Hashimoto et al. ........ 348/207.1 |
| 6,515,704 | B1 | * | 2/2003 | Sato .................... 348/333.11 |
| 6,697,734 | B1 | * | 2/2004 | Suomela ................. 701/455 |
| 7,046,285 | B2 | * | 5/2006 | Miyagi et al. ........... 348/333.05 |
| 7,359,798 | B2 | | 4/2008 | Nagamasa |
| 7,949,965 | B2 | * | 5/2011 | Tominaga ................ 715/764 |
| 2007/0035639 | A1 | * | 2/2007 | Aridome et al. .......... 348/231.3 |
| 2007/0257993 | A1 | * | 11/2007 | Hara et al. ............. 348/231.2 |
| 2009/0169060 | A1 | * | 7/2009 | Faenger et al. .......... 382/113 |
| 2009/0278973 | A1 | * | 11/2009 | Sogoh et al. ............ 348/333.02 |
| 2009/0281720 | A1 | * | 11/2009 | Jakobson ................ 701/202 |
| 2010/0115459 | A1 | * | 5/2010 | Kinnunen et al. ......... 715/785 |
| 2010/0250561 | A1 | | 9/2010 | Nishiyama et al. |

FOREIGN PATENT DOCUMENTS

| | | | |
|---|---|---|---|
| JP | 2005-100353 | A | 4/2005 |
| JP | 2005-181611 | A | 7/2005 |
| JP | 2007-199593 | A | 8/2007 |
| JP | 2009-009499 | A | 1/2009 |
| JP | 2009-130592 | A | 6/2009 |
| JP | 2009-134333 | A | 6/2009 |
| JP | 2009-159617 | A | 7/2009 |
| WO | WO 2009/057749 | A1 | 5/2009 |

OTHER PUBLICATIONS

Japanese Office Action dated Feb. 7, 2012 (and English translation thereof) in counterpart Japanese Application No. 2009-284829.
Japanese Office Action dated Feb. 26, 2013 (and English translation thereof) in counterpart Japanese Application No. 2012-095466.

* cited by examiner

FIG. 3

| DISTANCES BETWEEN LOCATION INDICATED BY CURRENT-LOCATION DATA AND LOCATION INDICATED BY IMAGE-LOCATION DATA | SIZES OF THUMBNAIL IMAGE (WIDTH × LENGTH) OR (LENGTH × WIDTH) | RATIO TO STANDARD SIZE |
|---|---|---|
| 0 ~ 10 m | 8 × 6 mm (STANDARD SIZE) | 1.0 |
| 10 ~ 20 m | 6.4 × 4.8 mm | 0.8 |
| 20 ~ 30 m | 4.8 × 3.6 mm | 0.6 |
| 30 m OR MORE | 3.2 × 2.4 mm | 0.4 |

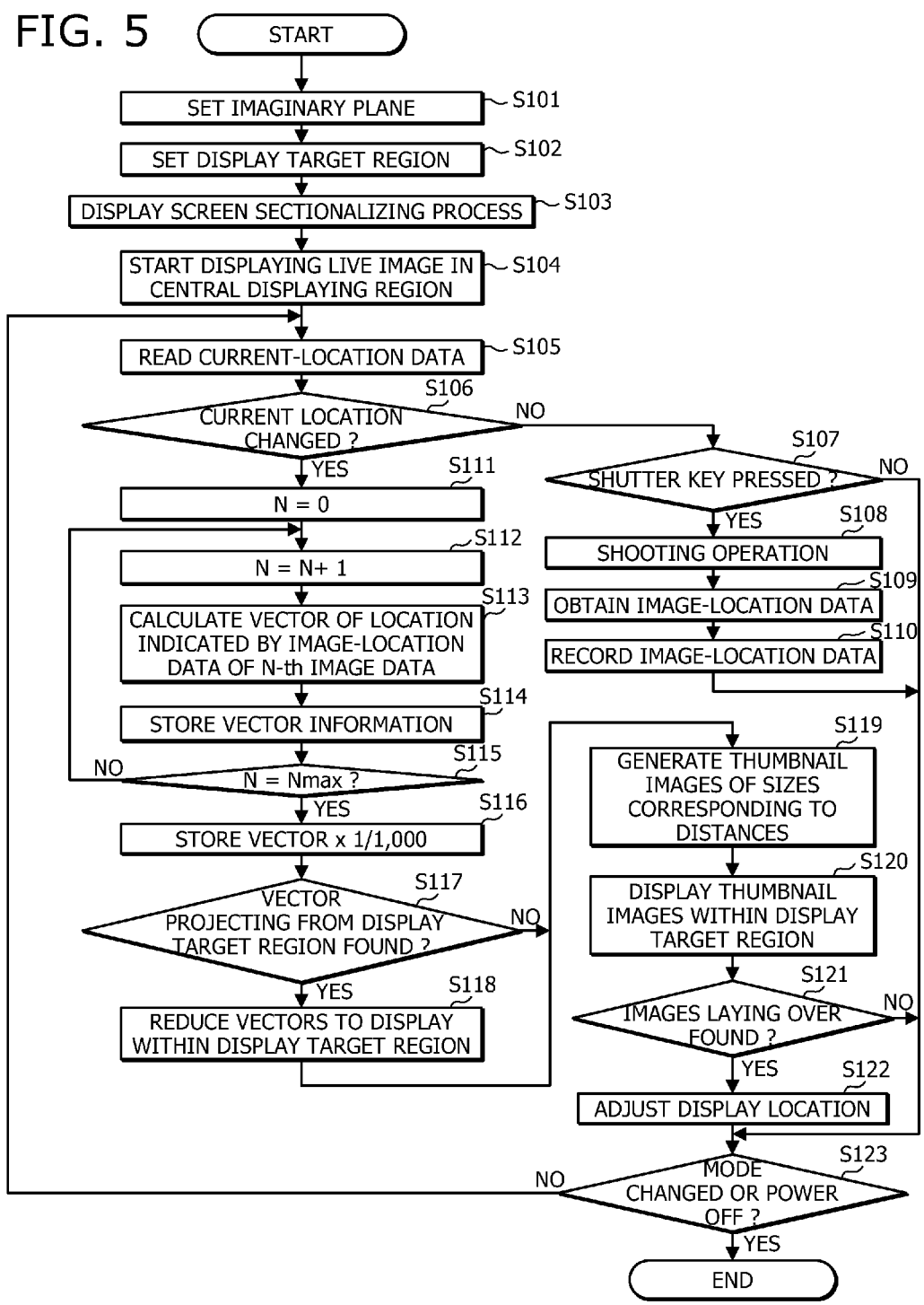

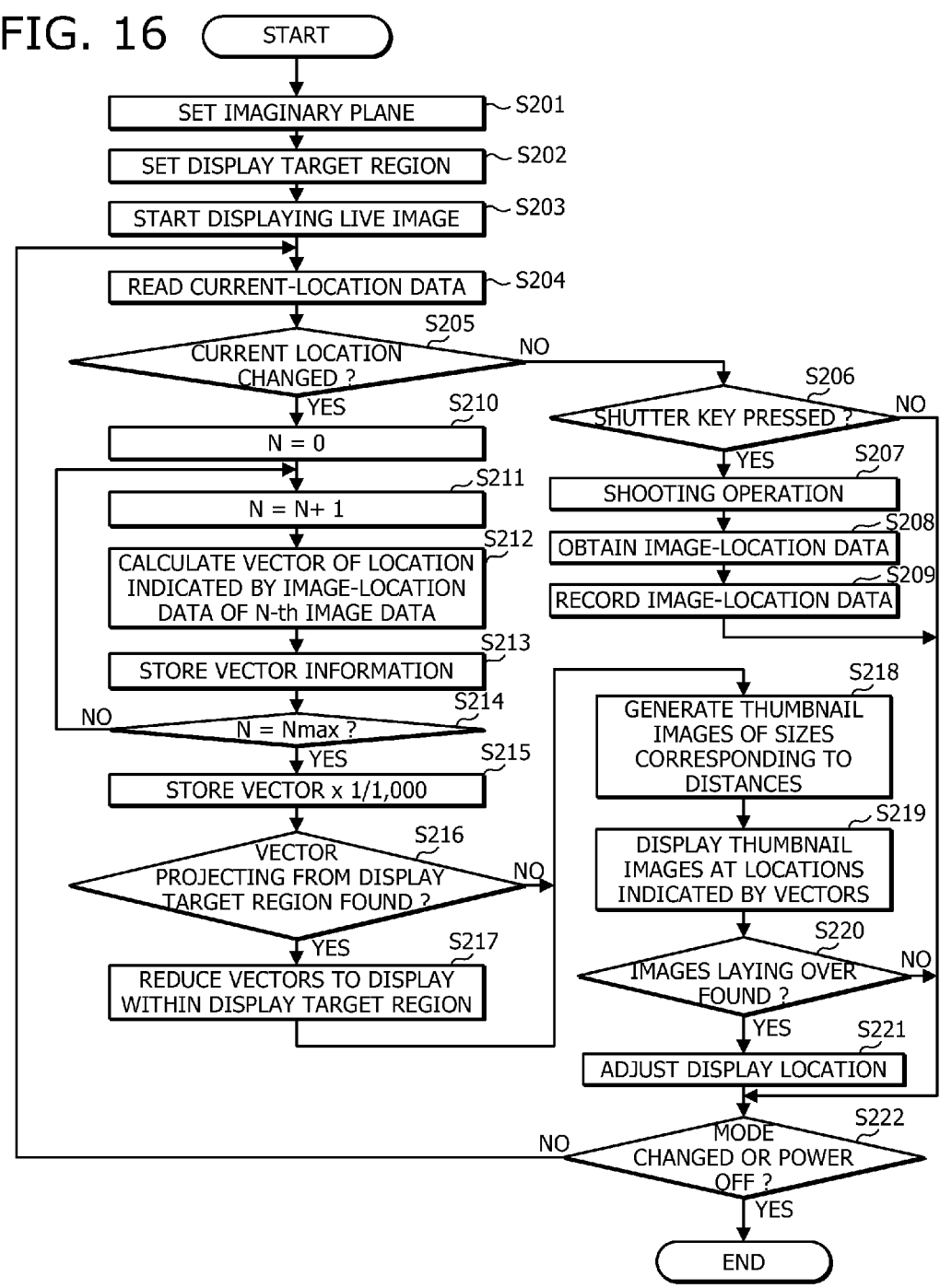

IMAGE PROCESSING APPARATUS AND RECORDING MEDIUM

BACKGROUND OF THE INVENTION

1. Field of the Invention

The present invention relates to an image processing apparatus for displaying on a display screen image indexes representing contents of image data, and a computer readable recording medium recording a computer program used in the image processing apparatus.

2. Description of the Related Art

In a conventional technique, when an image is shot and recorded with a cellular phone, location information representing a location where the image is shot with the cellular phone is obtained. The obtained image is recorded as an image file associated with the location information. For instance, refer to Japanese Patent No. 2005-100353 A, which discloses such conventional technique.

When the image is displayed on a display screen of the cellular phone, location information representing a current location of the cellular phone is obtained and the current location indicated by the obtained location information is set to the center of the display screen. Icons representing image files are displayed on the display screen in accordance with relative position-relationships between the current location set at the center of the display screen and locations represented by location information associated with the image files.

But when displaying the icons of the image files on the display screen, the conventional technique displays the icons at respective positions on the display screen simply based on the position-relationships between the current location of the cellular phone and locations represented by the location information of image files. In other words, the conventional technique displays the icons of the image files respectively at positions on the display screen simply affected by the relationships between the current location and locations represented by the location information corresponding to the image files. Hereinafter, the above position-relationships between the current location and locations represented by the location information of image files are referred to as the "conventional standard".

SUMMARY OF THE INVENTION

The present invention has been made in consideration of the problems involved in the conventional technique, and has an object to provide an image processing apparatus and a recording medium storing a computer program used therein, which allows position-relationships to reflect a display of images on a display screen of the apparatus, between a current location of the apparatus operated by a user and locations where the images have been shot using the apparatus.

According to one aspect of the invention, there is provided an image processing apparatus, which comprises image-data obtaining means for obtaining image data representing an image, displaying means having a display screen for displaying on the display screen an image represented by the image data obtained by the image-data obtaining means, current-location data obtaining means for successively obtaining current-location data, wherein the current-location data indicates a location where the image processing apparatus is kept at present, image-location data obtaining means for obtaining as image-location data the current-location data obtained by the current-location data obtaining means, at the time when the image-data obtaining means has obtained the image data, record controlling means having storing means for storing in the storing means the image data and the image-location data associated with each other, first location related data generating means for generating first location related data indicating a distance between an initial point and a terminal point and direction of the terminal point seen from the initial point, wherein the initial point corresponds to a location indicated by the current-location data obtained by the current-location data obtaining means and the terminal point corresponds to a location indicated by the image-location data corresponding to the image data, second location related data generating means for scaling down on a scale ratio a distance indicated by the first location related data with the initial point set at a center of a predetermined area set on an imaginary plane, thereby generating second location related data, wherein the scale ratio is given by a ratio of a length of a side in the predetermined area to a length of a corresponding side in a display target region having the same size as the display screen, data processing means for converting the second location related data into third location related data with an initial point set at a center of the display target region, and for judging whether any third location related data having a terminal point outside the display target region is found or not, and for, when third location related data having a terminal point outside the display target region is found, reducing a distance of only the third location related data having a terminal point outside the display target region so that the terminal point falls within the display target region, thereby generating fourth location related data including the third location related data, and display controlling means for displaying image indexes representing contents of the image data stored in the storing means on the display screen of the displaying means in accordance with locations indicated by the forth location related data.

According to another aspect of the invention, there is provided a computer readable recording medium to be mounted on an apparatus, wherein the apparatus is provided with a computer, image-data obtaining means for obtaining image data representing an image, displaying means having a display screen for displaying on the display screen an image represented by the image data obtained by the image-data obtaining means, and location-data obtaining means for successively obtaining current-location data, wherein the current-location data indicates a location where the image processing apparatus is kept at present, the recording medium storing a computer program, when executed, to make the computer perform means, which comprises image-location data obtaining means for obtaining as image-location data the current-location data obtained by the current-location data obtaining means, at the time when the image-data obtaining means has obtained the image data, record controlling means having storing means for storing in the storing means the image data and the image-location data associated with each other, first location related data generating means for generating first location related data indicating a distance between an initial point and a terminal point and direction of the terminal point seen from the initial point, wherein the initial point corresponds to a location indicated by the current-location data obtained by the current-location data obtaining means and the terminal point corresponds to a location indicated by the image-location data corresponding to the image data, second location related data generating means for scaling down on a scale ratio a distance indicated by the first location related data with the initial point set at a center of a predetermined area set on an imaginary plane, thereby generating second location related data, wherein the scale ratio is given by a ratio of a length of a side in the predetermined area to a length of a corresponding side in a display target region having the same size as the display screen, data processing means for converting the second location related data into third location related data with an initial point set at a center of the display target region, and for judging whether any third location related data having a terminal point outside the display target region is found or not, and for, when third location related data having a terminal point outside the display target region is found, reducing a distance of only the third location related data having a terminal point outside the display target region so that the terminal point falls within the display target region, thereby generating fourth location related data including the third location related data, and display controlling means for displaying image indexes representing contents of the image data stored in the storing means on the display screen of the displaying means in accordance with locations indicated by the forth location related data.

According to still another aspect of the invention, there is provided an image processing apparatus, which comprises image-data obtaining means for obtaining image data representing an image, displaying means comprising a display screen having a central displaying region and a belt-like marginal displaying region, for displaying on the display screen an image represented by the image data obtained by the image-data obtaining means, wherein the central displaying region is prepared at the central portion of the display screen and the belt-like marginal displaying region is prepared at a peripheral portion of the display screen so as to surround the central displaying region, current-location data obtaining means for successively obtaining current-location data, wherein the current-location data indicates a location where the image processing apparatus is kept at present, image-location data obtaining means for obtaining as image-location data the current-location data obtained by the current-location data obtaining means, at the time when the image-data obtaining means has obtained the image data, record controlling means having storing means for storing in the storing means the image data and the image-location data associated with each other, and display controlling means for displaying in the central displaying region of the display screen an image represented by the image data that is obtained at a current location by the image-data obtaining means, and for displaying thumbnail images of the image data stored in the storing means respectively at positions within the marginal displaying region of the display screen, wherein the positions are adjusted based on the image-location data stored in the storing means.

According to other aspect of the invention, there is provided a computer readable recording medium to be mounted on an apparatus, wherein the apparatus is provided with a computer, image-data obtaining means for obtaining image data representing an image, displaying means comprising a display screen having a central displaying region and a belt-like marginal displaying region, for displaying on the display screen an image represented by the image data obtained by the image-data obtaining means, wherein the central displaying region is prepared at the central portion of the display screen and the belt-like marginal displaying region is prepared at a peripheral portion of the display screen so as to surround the central displaying region, and location-data obtaining means for successively obtaining current-location data, wherein the current-location data indicates a location where the image processing apparatus is kept at present, the recording medium storing a computer program, when executed, to make the computer perform means, which comprises image-location data obtaining means for obtaining as image-location data the current-location data obtained by the current-location data obtaining means, at the time when the image-data obtaining means has obtained the image data, record controlling means having storing means for storing in the storing means the image data and the image-location data associated with each other, and display controlling means for displaying in the central displaying region of the display screen an image represented by the image data that is obtained at a current location by the image-data obtaining means, and for displaying thumbnail images of the image data stored in the storing means respectively at positions within the marginal displaying region of the display screen, wherein the positions are adjusted based on the image-location data stored in the storing means.

According to the present invention, images can be displayed on the display screen not based on the conventional standard but in accordance with relationships between the current location of the apparatus operated by the user and locations where the images have been shot using the apparatus.

The above and further objects and novel features of the present invention will be more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a view showing a table indicating display sizes of thumbnail images.

FIG. 5 is a flow chart of operation to be performed in the first embodiment of the invention.

FIG. 16 is a flow chart of operation to be performed in the second embodiment of the invention.

DETAILED DESCRIPTION OF THE PREFERRED EMBODIMENTS

Figure 1:
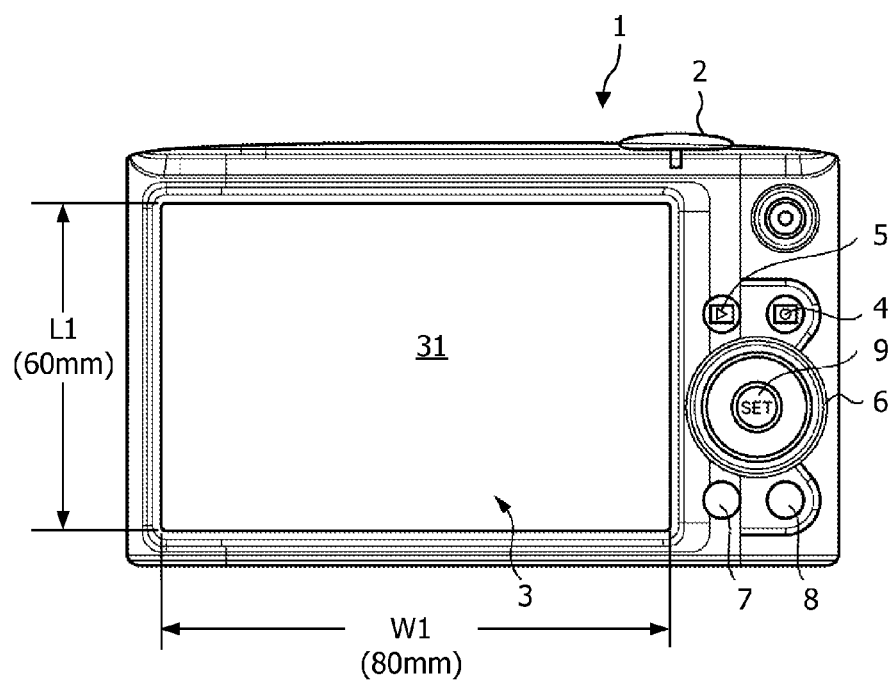
FIG. 1 is a rear view illustrating an external configuration of a digital camera in the first and second embodiment of the present invention.

Now, one embodiment of a digital camera according to the present invention will be described in detail with reference to the accompanying drawings. FIG. 1 is a rear view illustrating an external configuration of the digital camera (digital camera 1) in the first and second embodiment of the invention. The digital camera 1 is provided with a shutter key 2 on its top surface.

The digital camera 1 is provided with a liquid crystal displaying unit 3 on its rear surface. The liquid crystal displaying unit 3 has a display screen 31 with an aspect ratio of 4:3. In the embodiment, the display screen 31 of the liquid crystal displaying unit 3 is 80 mm in width (W1) and 60 mm in length (L1). The aspect ratio, width and length of the display screen 31 are not limited to the above dimensions, but can take other dimensions.

At the side of the display screen 31 of the liquid crystal displaying unit 3, there are provided a shooting mode button 4, reproducing mode button 5, page turning key 6, menu button 7 and other function button 8. At the center of the page advance/return key 6, there is provided a set key 9.

The shooting mode button 4 is operated to set a shooting mode. The reproducing mode button 5 is operated to set a reproducing mode. The shooting mode button 4 and the reproducing mode button 5 have a function of a power ON/OFF key, too.

The page turning key 6 is a toggle-type key. The page turning key 6 generates an instruction of turning a page or an instruction of turning back a page in response to user's operation on a right side end or a left side end of the page turning key 6. Further, the page turning key 6 generates an instruction corresponding to an "upward arrow" or a "downward arrow" displayed on the display screen 31 in response to the user's operation on an upper side end or a lower side end of the page turning key 6.

The menu button 7 is operated to display a menu with a cursor on the display screen 31, wherein the menu includes plural items to be selected by the user. The cursor is displayed on the display screen 31 together with the plural items in response to user's operation on the menu button 7, and can be moved in response to the user's operation on the upper side end and/or lower side end of the page turning key 6. The user can select his or her desired item among the menu by operating the set key 9 with the cursor staying on such item.

Figure 2:
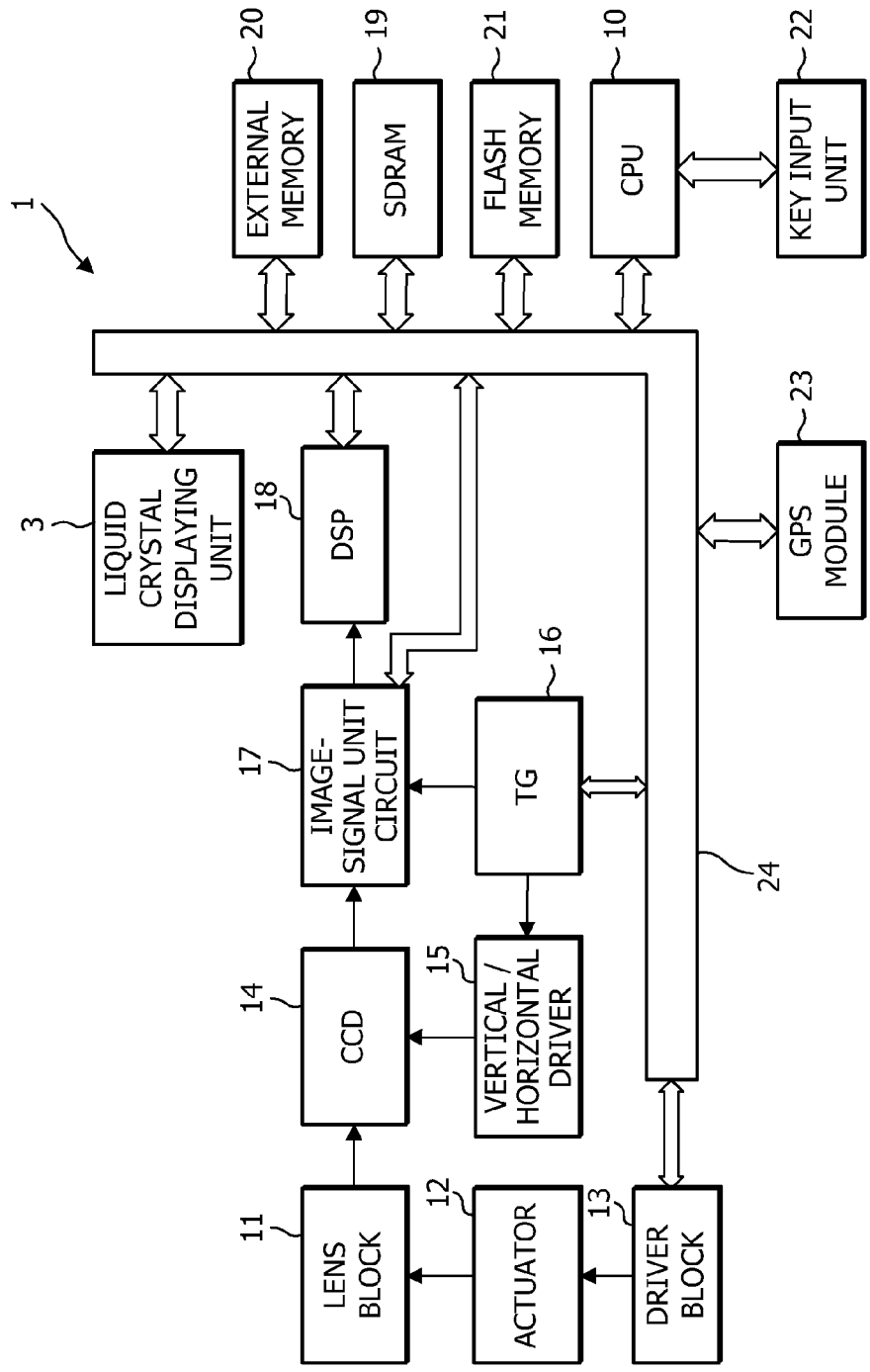
FIG. 2 is a block diagram showing an outline of a hardware configuration of the digital camera in the first and second embodiment of the present invention.

FIG. 2 is a block diagram showing an outline of a hardware configuration of the digital camera 1 in the first and second embodiment of the present invention.

The digital camera 1 is constructed such that operation of a while system of the camera is controlled by CPU (Central Processing Unit) 10. The digital camera 1 has a lens block 11, which comprises an optical system including a focus lens and a mechanical shutter. Further, the digital camera 1 has an actuator 12 including as electric motors for driving the optical system and the mechanical shutter in the lens block 11. A driver block 13 includes various drivers for driving the actuator 12 and is connected to CPU 10 through a bus 24.

The digital camera 1 has a solid-state image pick-up device for shooting an object to pick up an image of the object, such as CCD (Charge Coupled Device) 14. CCD 14 is a well known solid-state image pick-up device of a charge transfer type.

A vertical/horizontal driver 15 generates a CCD driving signal based on a vertical CCD drive timing signal, horizontal CCD drive timing signal and an electronic shutter timing signal generated by TG (Timing Generator) 16, and supplies the generated CCD driving signal to CCD 14 to drive the same 14.

In accordance with a sort of a driving mode set by CPU 10, TG 16 generates a drive timing signal including the vertical CCD drive timing signal, horizontal CCD drive timing signal and the electronic shutter timing signal. TG 16 has a built-in register for recording setting values indicating the sorts of the driving mode of CCD 14 to be set. When one of the setting values has been set by CPU 10, TG 16 generates the vertical CCD drive timing signal, horizontal CCD drive timing signal and the electronic shutter timing signal in accordance with the sort of the driving mode corresponding to the setting value set by CPU 10.

CCD 14 is driven by the vertical/horizontal driver 15 to optically convert an optical image of the object (object image) focused on the optical system in the lens block 11 into an analog image signal representing the object image, and then supplies the analog image signal to an image-signal unit circuit 17.

The unit circuit 17 comprises CDS (Correlated Double Sampling) circuit, AGC (Automatic Gain Control) circuit, and A/D (analog/Digital) converter unit. CDS circuit performs a correlated double sampling process on the analog image signal supplied from CCD 14 to remove noises involved therein. AGC circuit amplifies the analog image signal with noises removed and supplies the amplified image signal to A/D converter unit. A/D converter unit converts the supplied analog image signal into a digital image signal, and supplies the digital image signal to DSP (Digital Signal Processor) 18.

DSP 18 performs a pedestal clumping process on the supplies image signal to obtain RGB data, and further converts RGB data into image data including a luminance (Y) component and color difference (UV) components. Further, DSP 18 performs a digital signal processing on the image data for improving image quality of the image data, wherein the digital signal processing includes automatic white balancing, contour enhancement and pixel interpolation. The image data is successively stored in SDRAM 19.

In the shooting mode, image data is transferred to the liquid crystal displaying unit 3 and a live image of the image data is displayed on the display screen 31 every time one frame (one image) of image data is stored in SDRAM 19. At the time when the shutter button 2 has been pressed to perform a shooting operation, CPU 10 compresses the image data temporarily stored in SDRAM 19 and records in an external memory 20 the compressed image data as an image file in a predetermined format. The external memory 20 is a detachable memory card to be connected to the camera body of the digital camera 1 through a card interface (not shown).

In the embodiments of the invention, the image data is stored in the external memory 20 in EXIF (Exchangeable Image File Format). But the image data can be stored in the external memory 20 in any other format.

In a reproducing mode, CPU 10 reads the image file from the external memory 20 in response to user's selecting operation. Further, CPU 10 expands the image file on SDRAM 19, and then displays the image data on the liquid crystal displaying unit 3.

A flash memory 21 is a memory for storing plural sorts of programs and data, which are run and/or used by CPU 10 to control the whole operation of the digital camera 1. An automatic focusing control program is included in the programs stored in the flash memory 21, wherein the automatic focusing control program is run by CPU 10 to automatically move the optical system in the lens block 11 to a focusing position to focus on the object in a well known contrast detecting system.

CPU 10 is connected with a key input unit 22 and GPS (Global Positioning System) module 23. The key input unit 22 includes various sorts of keys and buttons from the shutter key 2 to the set key 9, and other switches. CPU 10 periodically scans an operating state of the switches in the key input unit 22, thereby obtaining an operation signal corresponding to a switch operation performed by the user.

GPS module 23 receives C/A code (Coarse/Acquisition code) in L1 frequency band (1.57542 GHz) and demodulates and analyses the received C/A code to successively determine a latitude and longitude of the current location of the digital camera 1. In other words, GPS module 23 serves to successively obtain current-location data or data representing the latitude and longitude of the current location and to supply CPU 10 with the obtained current-location data.

FIG. 3 is a view showing a table 121 stored in the flash memory 21, in which table sizes of thumbnail images to be displayed are given. In the table (hereinafter, sometime referred to as "thumbnail-image display-size table") 121 are prepared a distance section 122, a size section 123, and a ratio section 124, wherein distances each between a location indicated by the current-location data and a location indicated by image-location data are given in the distance section 122, sizes of the thumbnail images are given in the size section 123, and ratios of image to the standard size are given in the ratio section 124.

More specifically, distances of "0 to not more than 10 meters", "10 to not more than 20 meters", "20 to not more than 30 meters" and "30 meters or more" are stored in the distance section 122. As will be described later, the distance recorded in the distance section 122 indicates a distance between a location indicated by the current-location data obtained by GPS module 23 and a location indicated by the image-location data embedded as EXIF data in the image data recorded in the external memory 20.

In the size section 123, sizes of "8 mm×6 mm", "6.4 mm×4.8 mm", "4.8 mm×3.6 mm" and "3.2 mm×2.4 mm" are recorded in association with the distances recorded in the distance section 122. As will be described later, the size recorded in the size section 123 indicates a dimension of a thumbnail image to be displayed in a marginal region of the display screen 31.

In the ratio section 124, ratios of "1.0", "0.8", "0.6" and "0.4" are recorded in association with the sizes recorded in the size section 123. The ratio recorded in the ratio section 124 indicates a dimension ratio of a thumbnail image to a standard size (8 mm×6 mm) of the thumbnail image.

Figure 4:
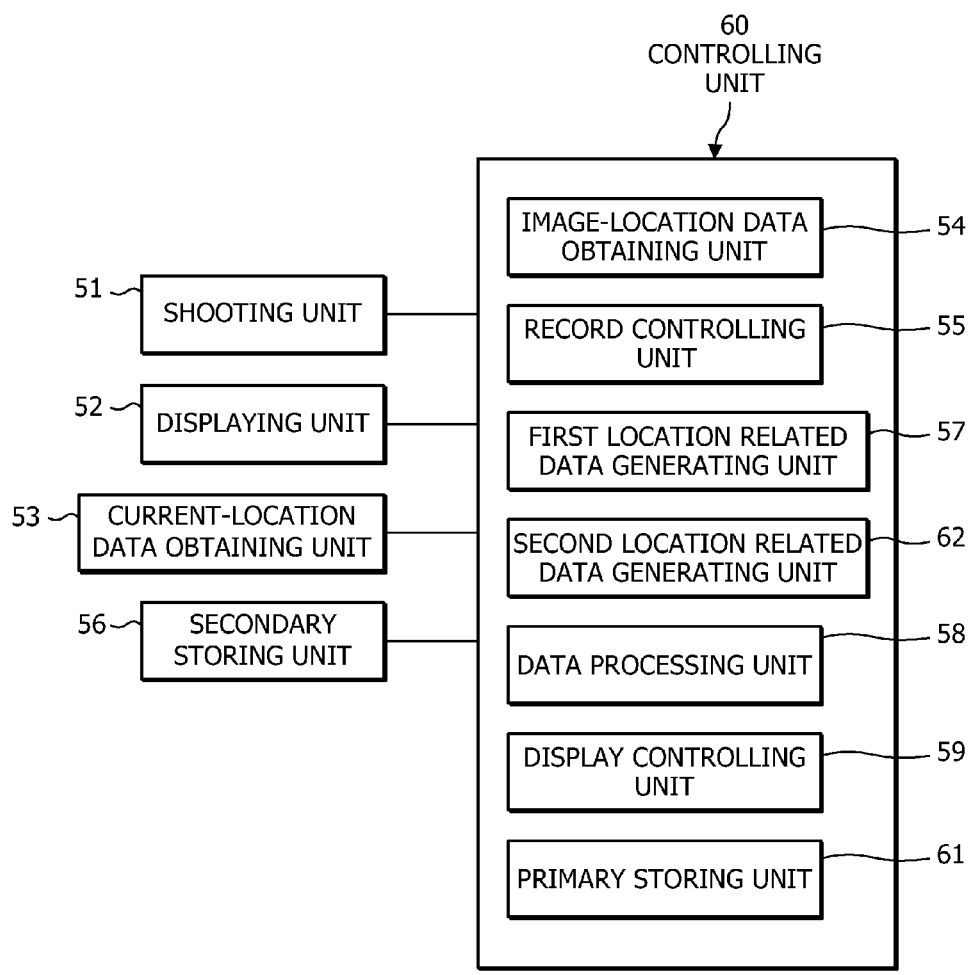
FIG. 4 is a functional block diagram showing essential functions of the digital camera in the first and second embodiment of the invention.

FIG. 4 is a functional block diagram showing essential functions of the digital camera 1 in the first and second embodiment of the invention. In FIG. 4, a shooting unit 51 serves to shoot an object to obtain image data representing the object. The shooting unit 51 comprises CCD 14, the image-signal unit circuit 17, and DSP 18 shown in FIG. 2.

A displaying unit 52 has a display screen for displaying image represented by the image data that is obtained by the shooting unit 51. The displaying unit 52 comprises the liquid crystal displaying unit 3 shown in FIG. 2.

A current-location data obtaining unit 53 serves to successively obtain current-location data representing the current location of the digital camera 1 at the time. The current-location data obtaining unit 53 comprises GPS module 23 shown in FIG. 2.

An image-location data obtaining unit 54 serves to obtain as image-location data the current-location data, which the current-location data obtaining unit 53 obtains at the time when the shooting unit 51 performs the shooting operation to obtain image data. The function of the image-location data obtaining unit 54 is realized by CPU 10 shown in FIG. 2.

A record controlling unit 55 serves to associate the image data obtained by the shooting unit 51 with the image-location data obtained by the image-location data obtaining unit 54 and to record the data associated with each other in a secondary storing unit 56. The function of the record controlling unit 55 is realized by CPU 10 shown in FIG. 2. The secondary storing unit 56 comprises the external memory 20.

Supposing that a location indicated by the current-location data obtained by the current-location data obtaining unit 53 is set as an initial point and a location indicated by the image-location data corresponding to the image data recorded in the secondary storing unit 56 is set as a terminal point, a first location related data generating unit 57 generates first location related data, which specifies a distance and direction of the location (terminal point) represented by the image-location data seen from the location (initial point) represented by the current-location data. The function of the first location related data generating unit 57 is realized by CPU 10 shown in FIG. 2.

A second location related data generating unit 62 serves to scale down on a scale ratio the distance represented by the first location related data with the location indicated by the current-location data in a predetermined area set on an imaginary plane at a center, thereby generating second location related data, wherein the scale ratio is given by a ratio of a length of a side in the area to a length of the corresponding side in a display target region having the same width as the display screen of the displaying unit 52. The function of the second location related data generating unit 62 is realized by CPU 10 shown in FIG. 2.

A data processing unit 58 converts the second location related data into third location related data with an initial point at the center of the display target region. The data processing unit 58 judges whether or not any location related data having a terminal point outside the display target region is included in the third location related data. And the data processing unit 58 reduces the distance of only the location related data having a terminal point outside the display target region such that such terminal point falls within the display target region. In this way, the data processing unit 58 generates fourth location related data including the third location related data. The function of the data processing unit 58 is realized by CPU 10 shown in FIG. 2.

A display controlling unit 59 serves to display on the display screen of the displaying unit 52 the image indexes representing contents of the image data stored in the secondary storing unit 56 at the locations represented by the fourth location related data. The function of the display controlling unit 59 is realized by CPU 10 shown in FIG. 2. The display controlling unit 59 displays the image indexes based on the distances and directions represented by the second location related data generated and altered by the data processing unit 58.

The display controlling unit 59 sectionalizes the display screen of the displaying unit 52 into a marginal displaying region provided at a peripheral portion of the display screen and a central displaying region surrounded by the marginal displaying region. The image indexes are displayed in the marginal displaying region of the display screen.

Further, the display controlling unit 59 displays in the central displaying region of the display screen a live image of image data that is obtained by the shooting unit 51 at present.

The display controlling unit 59 displays an image index having a size corresponding to a distance between the location indicated by the current-location data obtained by the current-location data obtaining unit 53 and the location indicated by the image-location data corresponding to the image data.

At this time, the display controlling unit 59 judges if there is any image index overlapping other image index. When an image index overlapping other image index has been found, the image index is moved and displayed at a position not to overlap such other image index.

The image index is, for instance, a thumbnail image or a reduced image of an image represented by the image data.

A primary storing unit 61 is used as a work area for temporarily storing data necessary when the image-location data obtaining unit 54, record controlling unit 55, first location related data generating unit 57, second location related data generating unit 62, data processing unit 58 and the display controlling unit 59 perform processes respectively to realize their functions. The function of the primary storing unit 61 is realized by SDRAM 19 shown in FIG. 2.

Therefore, a controlling unit 60 in the functional block diagram of FIG. 4 is realized by CPU 10 and SDRAM 19 in FIG. 2.

First Embodiment

Now, operation of the digital camera 1 according to the first embodiment of the invention will be described with reference a flow chart of FIG. 5. When a specific mode in the shooting mode, for example, "GPS shooting mode" has been set, the controlling unit 60 starts operation in accordance with the flow chart of FIG. 5. More specifically, CPU 10 runs the program stored in the flash memory 21 to perform the operation in accordance with the flow chart of FIG. 5.

Figure 6A:
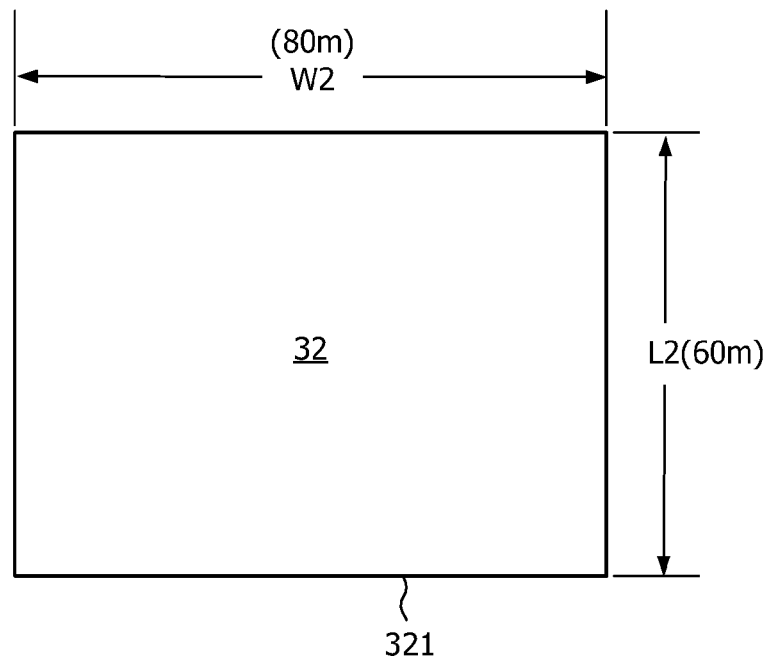
FIG. 6A is a view showing an imaginary plane.

The data processing unit 58 of the controlling unit 60 sets an imaginary flat plane at step S101. More specifically, CPU 10 generates, for example, an imaginary plane 32 having an area 321 in SDRAM 19, as shown in FIG. 6A. The area 321 of the imaginary plane 32 has the same aspect ratio (4:3) as the display screen 31 of the displaying unit 3, but is different in size from the display screen 31 of the displaying unit 3. The area 321 is set to be 80 m in width (W2) and 60 m in length (L2). In other words, the area 321 is supposed to be a rectangle of 80 m×60 m. But the imaginary plane 32 is wider than the area 321.

Figure 6B:
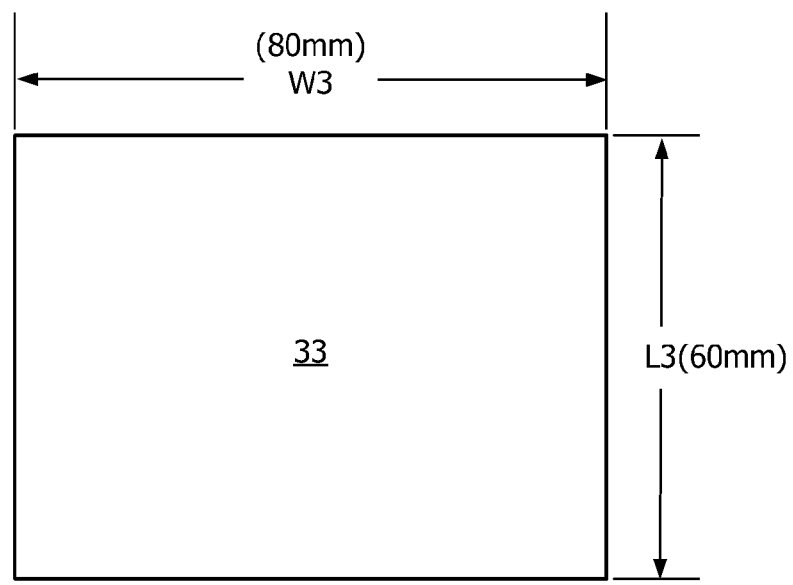
FIG. 6B is a view showing a display target region.

Further, the data processing unit 58 of the controlling unit 60 sets a display target region at step S102. More specifically, CPU 10 generates, for example, a display target region 33 in SDRAM 19 as shown in FIG. 6B. The display target region 33 is same in size as the display screen 31 of the liquid displaying unit 3, and is 80 mm in width (W3) and 60 mm in length (L3). In other words, the display target region 33 is supposed to be a rectangle of 80 mm×60 mm. The display target region 33 is a like figure to the area 321, and has a size of a distance ratio of 1/1,000 of the area 321.

Both the imaginary plane 32 having the area 321 and the display target region 33 are imaginary planes which are independent from each other and generated in separate spaces in SDRAM 19.

The size of the area 321 of the imaginary plane 32 and the size of the display target region 33 are shown by way of example in FIG. 6A and FIG. 6B, respectively, and therefore, the sizes of the area 321 and region 33 are not restricted to those shown in FIGS. 6A and 6B.

The display controlling unit 59 performs a display screen sectionalizing process at step S103.

Figure 7A:
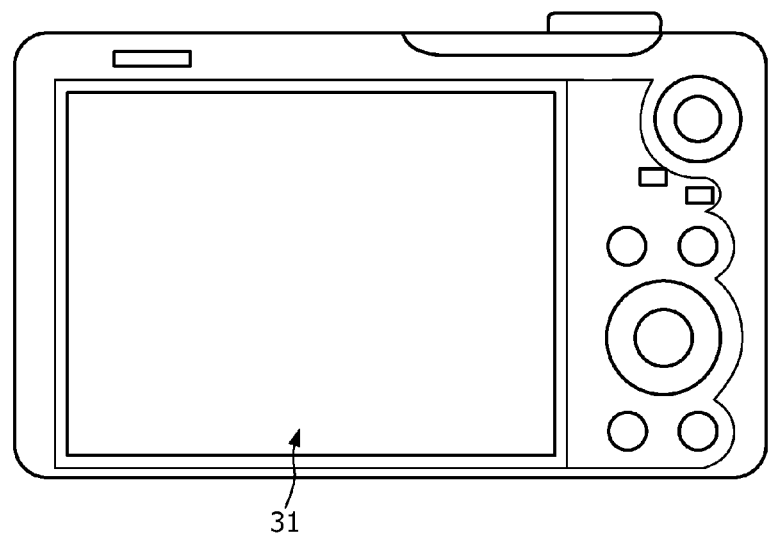
FIG. 7A is a view showing a display screen, which has not yet been subjected to the display screen sectionalizing process.
Figure 7B:
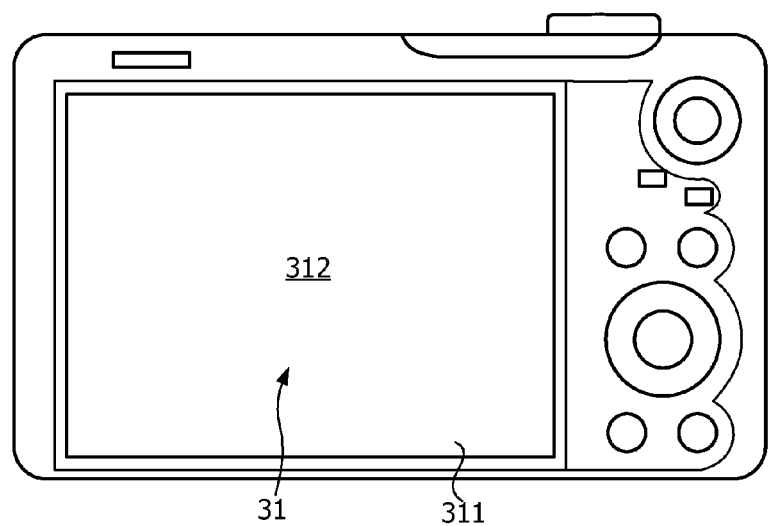
FIG. 7B is a view showing the display screen, which has been subjected to the display screen sectionalizing process.

FIGS. 7A and 7B are views showing contents of the display screen sectionalizing process performed at S103. FIG. 7A is a view showing the display screen 31, which has not yet been subjected to the display screen sectionalizing process, and a live image is displayed on the while area of the display screen. FIG. 7B is a view showing the display screen 31, which has been subjected to the display screen sectionalizing process, and sectionalized into a marginal displaying region 311 and a central displaying region 312.

The marginal displaying region 311 is a belt-like region provided at the peripheral portion of the display screen 31. When generating the marginal displaying region 311, CPU 10 refers to the table 121 indicating display sizes of thumbnail images shown in FIG. 3. CPU 10 sets a width of the marginal displaying region 311 based on the fundamental size "8 mm×6 mm" of the thumbnail image recorded in the table 121. More specifically, the width of the marginal displaying region 311 is set such that a thumbnail image of the fundamental size "8 mm×6 mm" can be displayed within such region 311 and the central displaying region 312 can be set as wide as possible at the central portion of the display screen 31. Therefore, the width of the marginal displaying region 311 is set to 9 mm, for example. This width of the marginal displaying region 311 is one example. The width of the marginal displaying region 311 is set depending on the fundamental size of the thumbnail image.

The display controlling unit 59 starts displaying a live view on the central displaying region 312 based on the image data obtained by the shooting unit 51 (Step S104). In other words, the optical system of the lens block 11 generates image data from a signal output from CCD 14 in accordance with an image focused on a light receiving plane and CPU 10 controls the liquid crystal displaying unit 3 in accordance with the image data generated by the optical system, whereby live view images (liquid crystal display images) or images successively focused on CCD 14 are displayed on the central displaying region 312.

The controlling unit 60 reads at step S105 the current-location data from the current-location data obtaining unit 53, which determines latitudes and longitudes of the current locations to obtain the current-location data. In other words, GPS module 23 successively determines latitudes and longitudes of the current location, obtaining the current-location data, and CPU 10 reads the current-location data from GPS module 23.

The controlling unit 60 compares the latest current-location data with the current-location data that is readjust before, whereby judging whether or not any change has happened in the current location of the digital camera 1 at step S106.

When the user of the digital camera 1 stops at one place to take a picture, or when no change in the current location of the digital camera 1 has been found, it is determined at step S106 that no change has happened in the current location of the digital camera 1 (NO at step S106). Then, the controlling unit 60 advances to step S107, where it is judged whether or not the shutter key 2 has been pressed.

When it is determined at step S107 that the shutter key 2 has been pressed (YES at step S107), the record controlling unit 55 performs a shooting operation at step S108 to record in the secondary storing unit 56 image data obtained by the shooting unit 51. More specifically, CPU 10 compresses the image data that is stored in SDRAM 19 at the time when the shutter key 2 has been pressed, and records in the external memory 20 the compressed image data as a still image file.

Further, the image-location data obtaining unit 54 obtains current-location data corresponding to a shooting time from the current-location data obtaining unit 53, and stores in the primary storing unit 61 the obtained current-location data as image-location data at step S109. More particularly, CPU 10 reads the current-location data from GPS module 23, which successively obtains current-location data, and temporarily stores in SDRAM 19 the read current-location data as image-location data. Therefore, the image-location data stored in SDRAM 19 represents the location of the digital camera 1 used at the time when the shooting operation has been performed.

The record controlling unit 55 records the image-location data that the image-location data obtaining unit 54 has obtained at step S109 as EXIF data of the image data that is recorded in the secondary storing unit 56 (external memory 20) at step S108 (step S110). As described above, in the image data that is shot in the "GPS shooting mode" and recorded in the external memory 20, image-location data is recorded as EXIF data.

Meanwhile, when it is determined at step S106 that change has happened in the current location of the digital camera 1 (YES at step S106), the controlling unit 60 advances to step S111, where the controlling unit 60 makes the first location related data generating unit 57 operate. The first location related data generating unit 57 resets a count number "N" to "0" for successively processing the image data, which has been shot and recorded in the secondary storing unit 56 (external memory 20) in the "GPS shooting mode". Then, the first location related data generating unit 57 increments the count number "N" at step S112.

The first location related data generating unit 57 calculates at step S113 a vector having the initial point at a current location and the terminal point at a location indicated by image-location data of N-th image data.

As is well known, a vector is defined as a "segment having direction and going from an initial point to a terminal point". In accordance with the above definition, the vector or segment is calculated at step S113, which has the initial point at the current location and the terminal location at the location indicated by image-location data of N-th image data and goes from the initial point to the terminal point.

In the external memory 20, image data shot in the "GPS shooting mode" and image data shot in a normal shooting mode are recorded, and it is possible to determine that the image data containing image-location data as EXIF data is the data shot in the "GPS shooting mode". The first location related data generating unit 57 selects the image data having image-location data as EXIF data from among the image data recorded in the external memory 20, and assigns continuous numbers "N" to the selected image data in time series order.

The image data which is assigned with a number of "N" will be called N-th image data in the following description. If "N=1" at present, a vector is calculated at step S113, which has the terminal point at a location indicated by image-location data of the first image data and the initial point at the current location.

Figure 8:
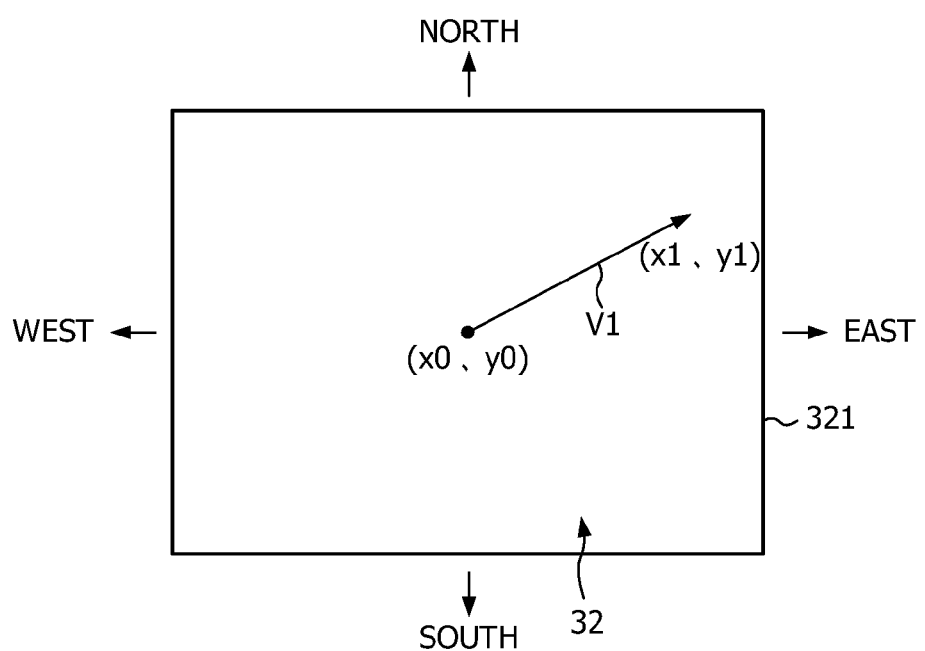
FIG. 8 is a view showing one example of a vector calculated at step S113 in the flow chart of FIG. 5.

FIG. 8 is a view showing an example of the vector calculated at step S113 in the flow chart of FIG. 5. In FIG. 8, a latitude and longitude are represented by "x" and "y", respectively. The current location is set at the center of the area 321, and the latitude and longitude of the current location are denoted by (x0, y0). When the latitude and longitude of the location indicated by the image-location data of the first image data are denoted by (x1, y1), then a vector V1 having the initial point at (x0, y0) and the terminal point at (x1, y1) is calculated at step S113, as shown in FIG. 8.

When the vector has been calculated as described above, the first location related data generating unit 57 (CPU 10) stores vector information in the primary storing unit 61 (SDRAM 19) at step S114, wherein the vector information is information for indicating the calculated vector.

Then, the first location related data generating unit 57 judges at step S115 whether or not the counter number "N" has reached Nmax, wherein Nmax corresponds to the total number of pieces of image data shot in the "GPS shooting mode" among the image data stored in the external memory 20. The first location related data generating unit 57 repeatedly performs the processes at steps S112, S113 and S114 with respect to all the image data shot in the "GPS shooting mode", until the first location related data generating unit 57 determines at step S115 that "N" has reached Nmax (YES at step S115).

Therefore, the processes of steps S113 and S114 are performed Nmax times in total.

Figure 9:
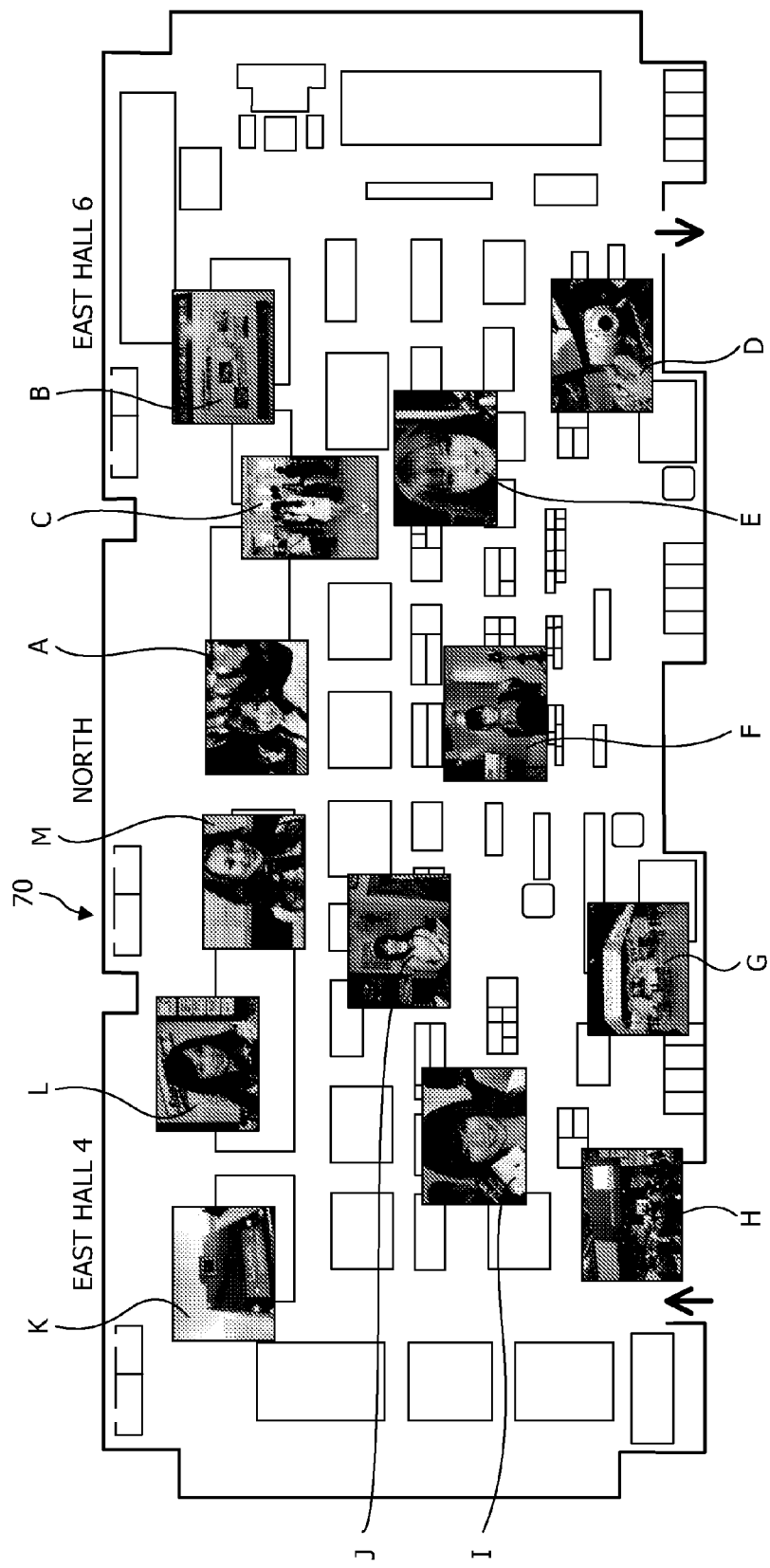
FIG. 9 is a conceptual view showing images represented by image data having location related data, which images are disposed at locations represented by the location related data.

FIG. 9 is a conceptual view showing images representing image data having location related data, which images are disposed respectively at locations represented by the location related data. In the case shown in FIG. 9, the user goes around a commercial-product exhibition hall 70, taking pictures with the digital camera 1 at several spots in the exhibition hall 70. The case shows that 13 pictures from "image data A" to "image data M" have been taken. Locations where the "image data A" to "image data M" are disposed correspond to locations in the exhibition hall 70 where the appropriate pictures have been taken, and correspond to the locations that are represented by the appropriate image-location data.

In the case shown in FIG. 9, 13 pieces of image data having image-location data, the "image data A" to the "image data M" are stored in the external memory 20. Therefore, in the case shown in FIG. 9, the processes of steps S113 to S114 are repeatedly performed 13 times.

Figure 10A:
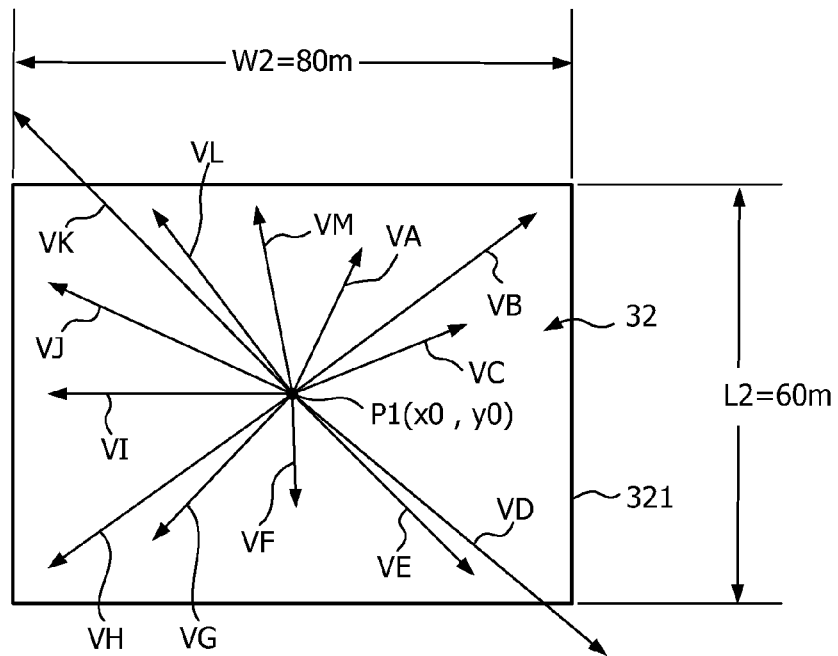
FIG. 10A is a view showing an example of vectors calculated at step S113 in the flow chart of FIG. 5.

When the processes are repeatedly performed as described above, vectors VA to VM are calculated, having the initial point at the current location (x0, y0) and the terminal points at locations which are represented by the "image data A" to "image data M", respectively, as shown in FIG. 10A. The first location related data including information indicating the vectors VA to VM is stored in SDRAM 19.

Then, the second location related data generating unit 62 scales down on a scale ratio of 1/1,000 the vectors calculated at step S113, thereby generating second location related data, and the data processing unit 58 stores the generated second location related data at step S116. More particularly, CPU 10 converts or makes the vectors stored in SDRAM 19 1/1,000 times shorter than the original, and writes the converted vectors onto the display target region 33 set at step S102.

In other words, as described above, in the present embodiment, the display target region 33 (width×length=80 mm×60 mm, FIG. 6B) is a like figure to the area 321 of the imaginary place 32 (width×length=80 m×60 m, FIG. 6A) with a side-length ratio of 1/1,000. Therefore, the vectors processed and stored at step S114 are scaled down on a scale ratio of 1/1,000 for judging at step S117 whether or not any vector projecting from the display target region 33 is included in the vectors stored in SDRAM 19.

Then, the vectors scaled down on the scale ratio of 1/1,000 are converted into vectors having the initial point at the center of the display target region 33, wherein the display target region 33 has been converted to have the center at the current location. The scaled-down vectors are written within such display target region 33 and then are stored in SDRAM 19. Now, in SDRAM 19 is generated third location related data, containing vectors which are obtained by scaling down by 1/1,000 the vectors VA to VM having the initial point at the center of the display target region 33.

Figure 10B:
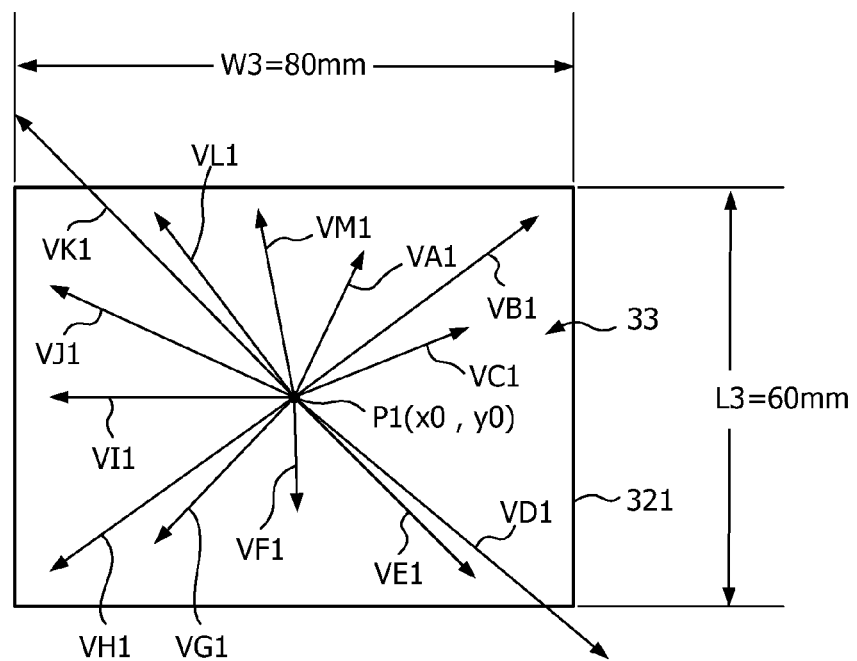
FIG. 10B is a view showing an example of vectors calculated at step S116 in the flow chart of FIG. 5.

In the process at step S116, the vectors VA1 to VM1 shown in FIG. 10B, that is, the third location related data, are written on the display target region 33 of 80 mm×60 mm within SDRAM 19, wherein the vectors VA1 to VM1 are 1/1,000 times in length the vectors VA to VM on the imaginary plane 32 of 80 m×60 m shown in FIG. 10A, respectively.

Then, the data processing unit 58 judges at step S117 whether or not any vector projecting from the display target region 33 is included among the vectors stored in SDRAM 19. In other words, CPU 10 judges based on the information indicating the vectors VA1 to VM1, whether or not any vector projecting from the display target region 33 is included in the vectors (vectors VA1 to VM1) stored in SDRAM 19, wherein the vector projecting from the display target region 33 is a vector having the terminal point outside the display target region 33.

When a vector projecting from the display target region 33 has been found at step S117 (YES at step S117), the data processing unit 58 changes at step S118 the length of the vector such that the terminal point of the vector falls within the display target region 33.

In the case shown in FIG. 10B, the vectors VD1 and VK1 project from the display target region 33, and therefore the result of the judgment at step S117 is "YES" (YES at step S117), and the data processing unit 58 advances from step S117 to step S118. The data processing unit 33 changes lengths of the vectors VD1 and VK1 such that the vectors fall within the display target region 33.

In short, in the case shown in FIG. 9, "image data D" (corresponding to the vector VD1) and "image data K" (corresponding to the vector VK1) are image data projecting from the display target region 33, and therefore the result of the judgment at step S117 is YES (YES at step S117). Accordingly, in this case the operation advances from step S117 to step S118, where the lengths of the vectors VD1 and VK1 are rewritten or reduced to the extent that each vector falls within the display target region 33.

Only the terminal points of the vectors are rewritten and the initial points and the directions of the vectors are not rewritten.

Figure 11:
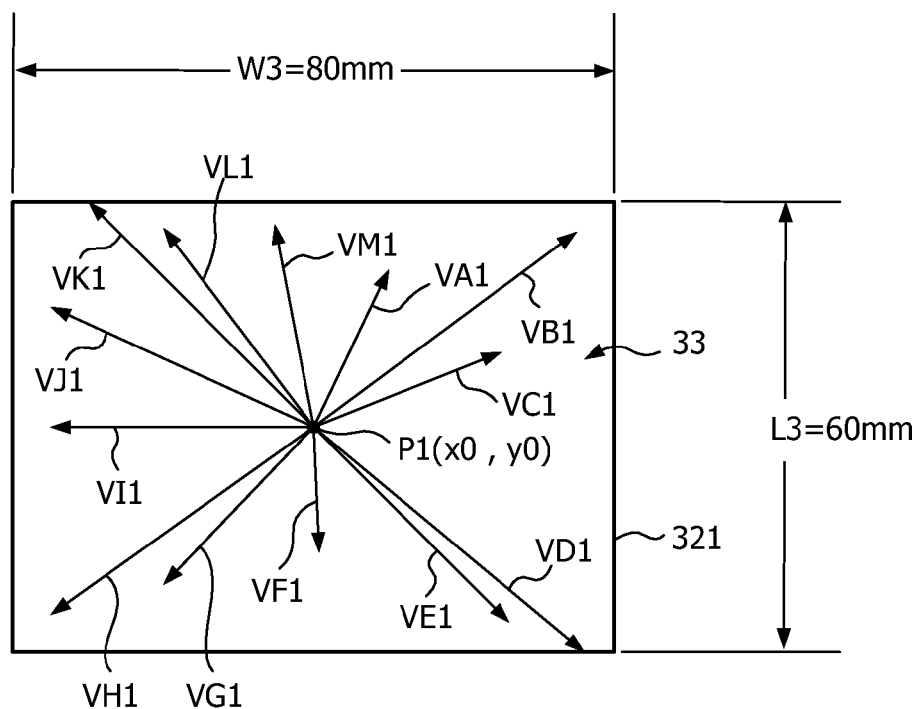
FIG. 11 is a view showing all the vectors which fall within the display target region.

After a process at step S118, the fourth location related data is generated, wherein the fourth location related data comprises the vectors VA1 to VM1 (including the vector VD1 and the vector VK1), which fall within the display target region 33, as shown in FIG. 11.

Then, the display controlling unit 59 generates at step S119 thumbnail images of the image data corresponding to all the vectors which fall within the display target region 33. More specifically, CPU 10 refers to the thumbnail-image display-size table 121 (FIG. 3) stored in the flash memory 21 and reads from the size section 123 the sizes of the thumbnail images corresponding to the distances represented by the vectors. Then, the thumbnail images of the image data are generated based on the sizes read from the size section 123 of the table 121.

Therefore, in the present embodiment, the sizes of the thumbnail images corresponding to the distances represented by the vectors VA to VM are read from the size section 123 of the thumbnail-image display size table 121, and thumbnail images of the image data "A" to "M" are generated based on the sizes of the thumbnail images read from the table 121.

When the distances represented by the vectors VA to VM fall within the range of "0 to not more than 10 meters", thumbnail images having a size of "8 mm×6 mm" are generated. When the distances represented by the vectors VA to VM fall within the range of "10 to not more than 20 meters", thumbnail images having a size of "6.4 mm×4.8 mm" are generated. When the distances represented by the vectors VA to VM fall within the range of "20 to not more than 30 meters", thumbnail images having a size of "4.8 mm×3.6 mm" are generated. When the distances represented by the vectors VA to VM are "30 meters or more", thumbnail images having a size of "3.2 mm×2.4 mm" are generated.

Figure 12A:
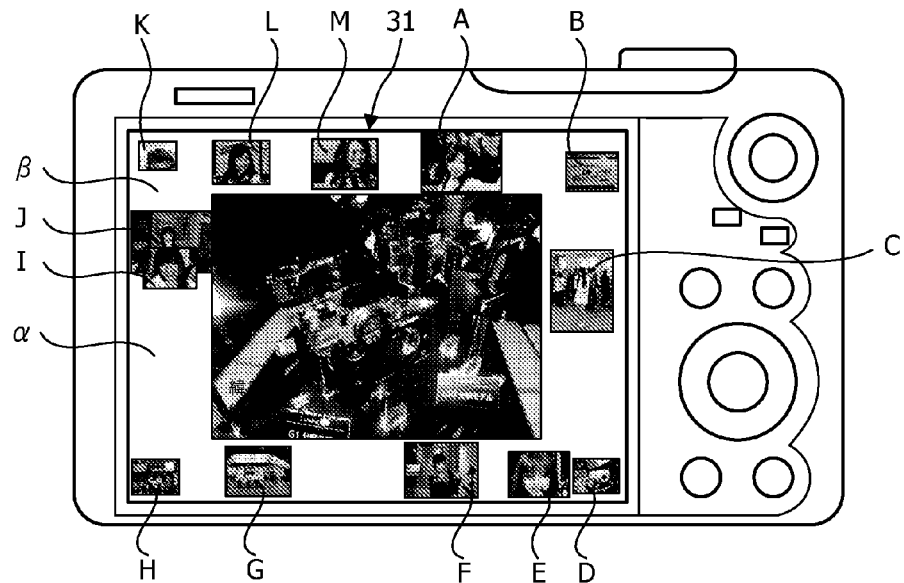
FIG. 12A is a view showing thumbnail images displayed in a marginal display area (some lays over the other).

The display controlling unit 59 displays at step S120 the generated thumbnail images in the directions represented by the vectors VA1 to VM1 and within the marginal displaying region 311, respectively, whereby thumbnail images "A" to "M" are displayed in the marginal displaying region 311, as shown in FIG. 12A.

Figure 12B:
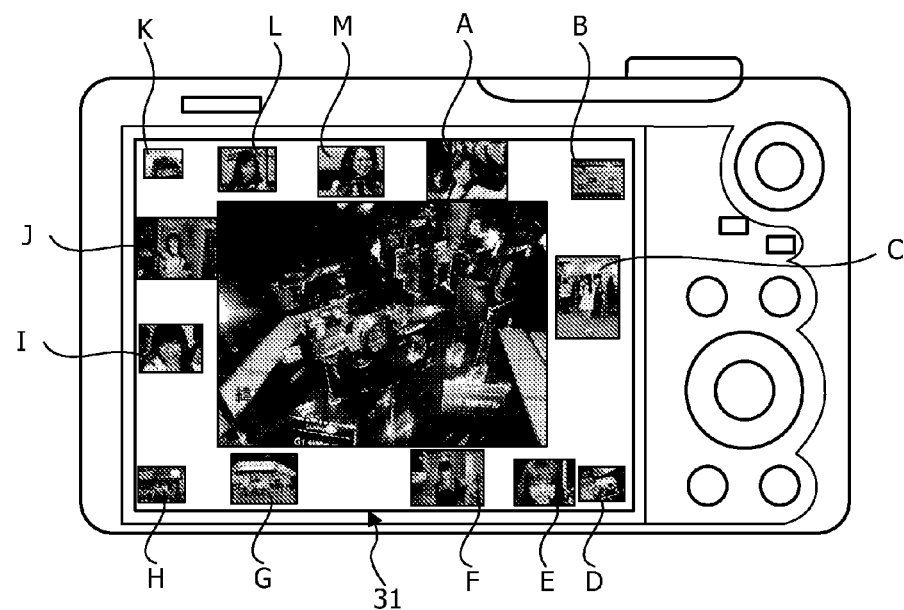
FIG. 12B is a view showing thumbnail images displayed in the marginal display area (no one lays over the other).

In FIGS. 9, 12A and 12B, for the purpose of clarity of relationship between the image data and the thumbnail images, the thumbnail images generated from the image data "A" to "M" are given the same reference symbols "A" to "M" as the image data "A" to "M", respectively.

In the present embodiment, the thumbnail images "D" and "K" generated from the image data "D" and "K" projecting from the display target region 33 can be displayed together with other thumbnail images. Therefore, it is possible to make the position-relationship between the location of the apparatus operated by the user and the location where a picture or an image has been taken reflect a display appearing on the display screen in accordance with a new standard, not depending on the conventional standard.

Further, in the present embodiment, since the thumbnail images are displayed as image indexes, the user can clearly confirm at first sight what images he or she has taken at the exhibition hall 70, whereby the user can check or shoot all the products on exhibit at the exhibition hall 70 without failure.

Furthermore, since the thumbnail images "A" to "M" are displayed in the marginal displaying region 311, a live image can be displayed in the central displaying region 312. Therefore, the whole displaying region (the marginal displaying region 311 and the central displaying region 312) of the display screen 31 is effectively used for clearly displaying a live image and thumbnail images "A" to "M".

Each of the thumbnail images "A" to "M" is displayed in a size proportional to the distance between the current location and the location where the corresponding image has been shot and is displayed smaller as the distance is larger, the user can understand the position-relationship between the current location and the location where the image has been shot.

After the thumbnail images are displayed in the marginal displaying region 311 at step S120, the display controlling unit 59 judges at step S121 whether or not any thumbnail image lays over the other. When a thumbnail image laying over the other is found (YES at step S121), the display controlling unit 59 changes at step S122 a location where the thumbnail image laying over the other is to be displayed. More specifically, the display controlling unit 59 moves one of the thumbnail images overlapping with each other, which has a space in the vicinity, to the space and displays the same at the space.

In the case shown in FIG. 12A, the thumbnail image "I" and the thumbnail image "J" overlap with each other. Therefore, the result of judgment at step S121 is YES (YES at step S121), and a process is performed at step S122, where a space "α" close to the thumbnail image "I" is compared with a space "β" close to the thumbnail image "J". The space "α" is wider than the space "β", and therefore, the thumbnail image "I" close to the space "α" is moved and displayed to the space "α", whereby the thumbnail image "I" and the thumbnail image "J" are displayed at separate locations so that both the thumbnail images do not lay overlap with each other as shown in FIG. 12B and all the thumbnail images "A" to "M" of the image data that has been recorded in the external memory 20 in the "GPS shooting mode" can be clearly displayed.

Following step S122, the controlling unit 60 judges at step S123 whether "GPS shooting mode" has been changed or the power has been turned off. Until "GPS shooting mode" has been changed or the power has been turned off (YES at step S123), the controlling unit 60 repeatedly performs the processes at steps S105 to S122.

Figure 13:
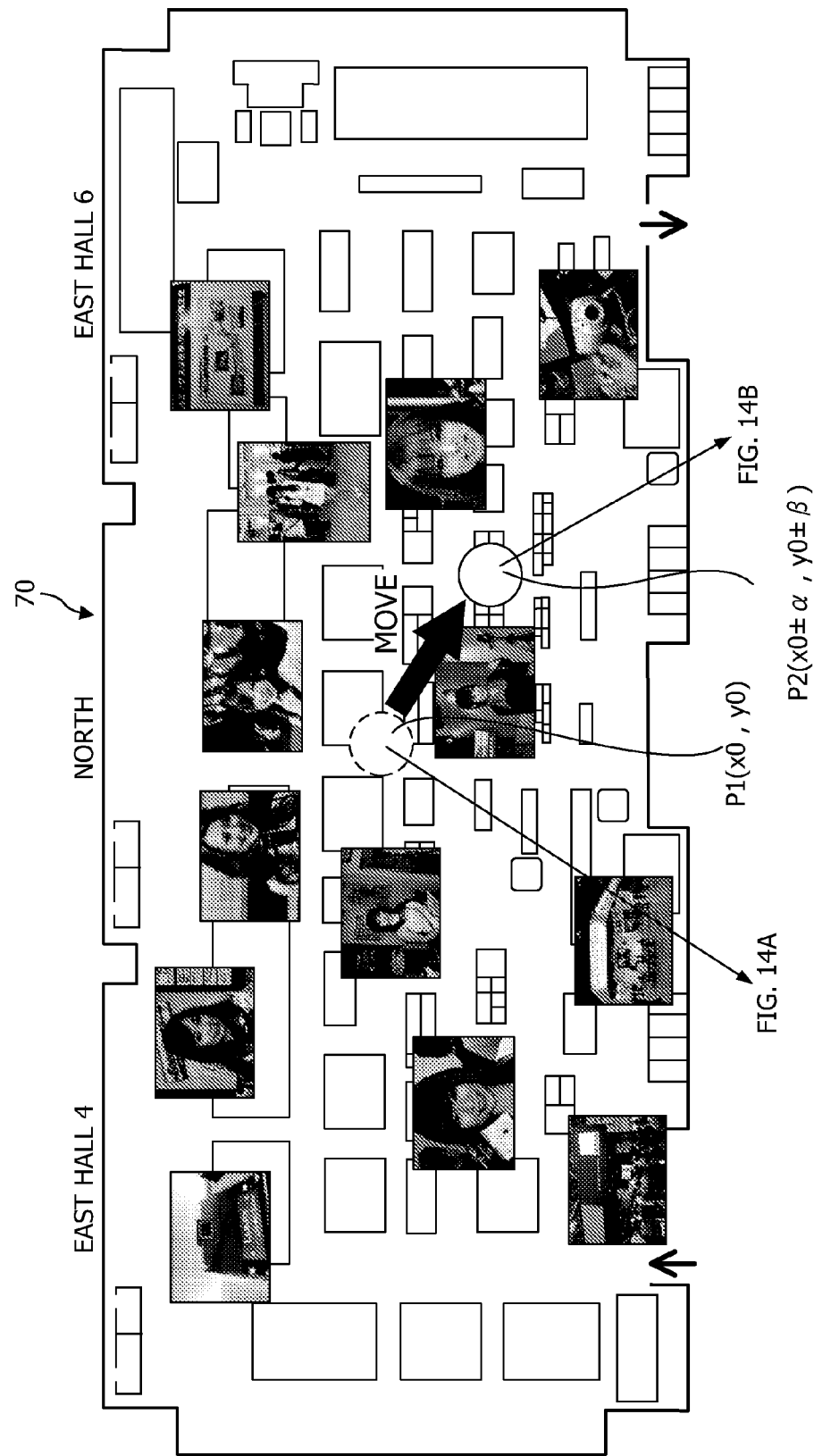
FIG. 13 is a view showing a display screen, in which a user moves from P1 to P2.
Figure 14A:
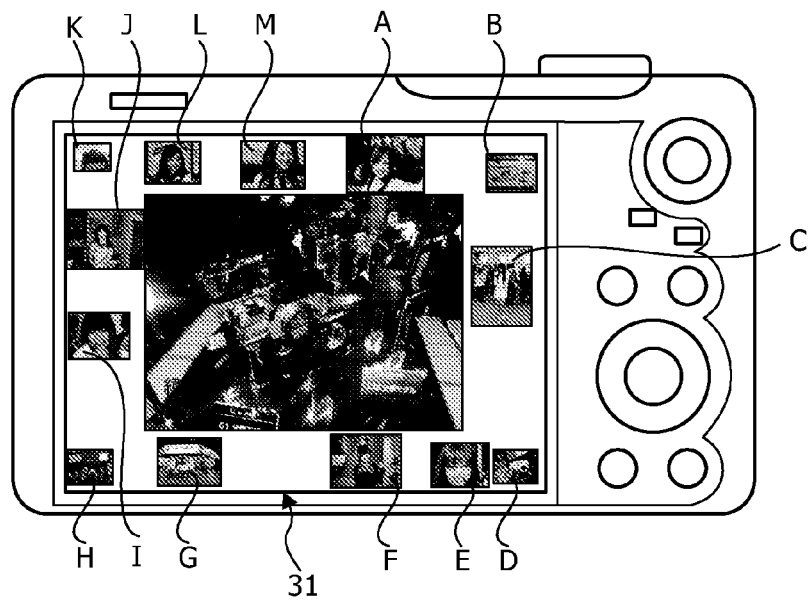
FIG. 14A is a view showing a displaying state with a camera kept at P1.
Figure 14B:
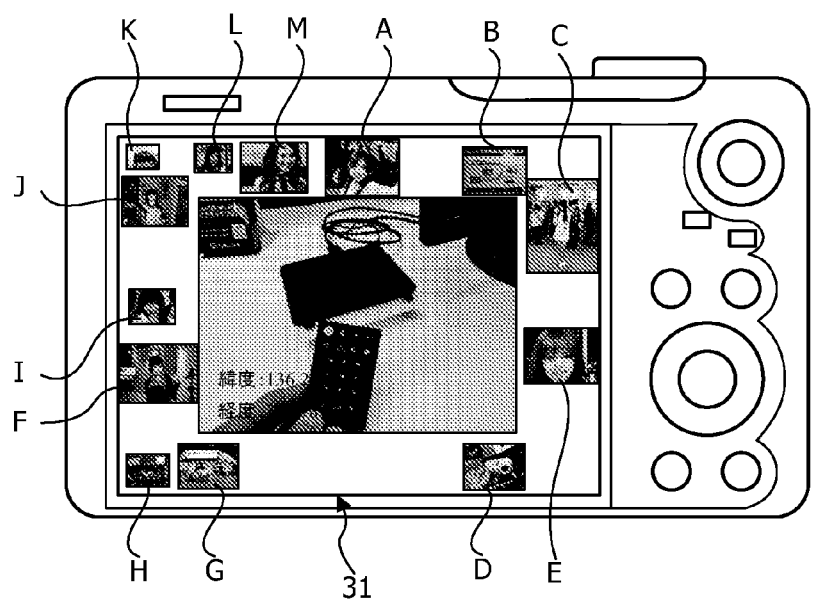
FIG. 14B is a view showing a displaying state with the camera moved to P2.

Therefore, when the user of the digital camera 1 moves from a location P1 to a location P2 in the exhibition hall 70 as shown in FIG. 13, the display screen 31 is changed from a displaying state (FIG. 14A) to a displaying state (FIG. 14B).

The displaying state (FIG. 14A) is the same as the displaying state shown in FIG. 12B and is a displaying state with the current location at the location P1. But when the current location (or the user) moves from the location P1 to the location P2 as shown in FIG. 13, the result of the judgment at step S106 is YES (YES at step S106) and the processes at step S111 and thereafter are performed. At this time, since the current location moves from the location P1 to the location P2, the coordinates of the current location change from (x0, y0) to (x0±α, y0±β), as shown in FIG. 13.

Figure 15A:
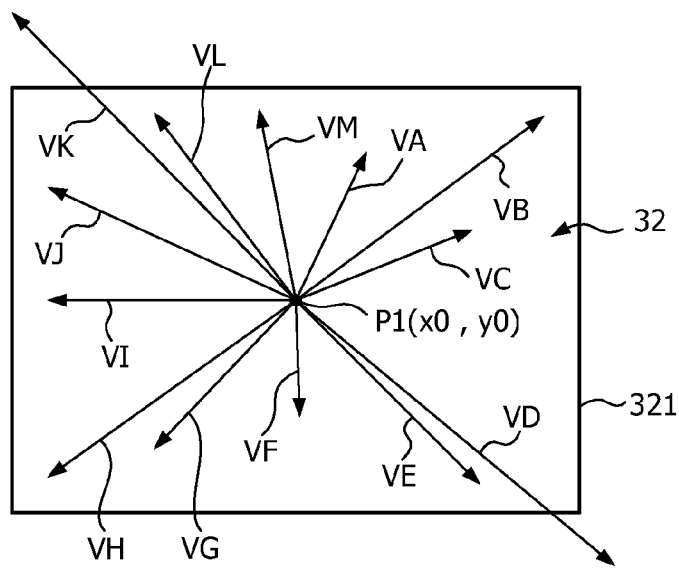
FIGS. 15A and 15B are views showing a vector calculated at step S113, which changes its direction.
Figure 15B:
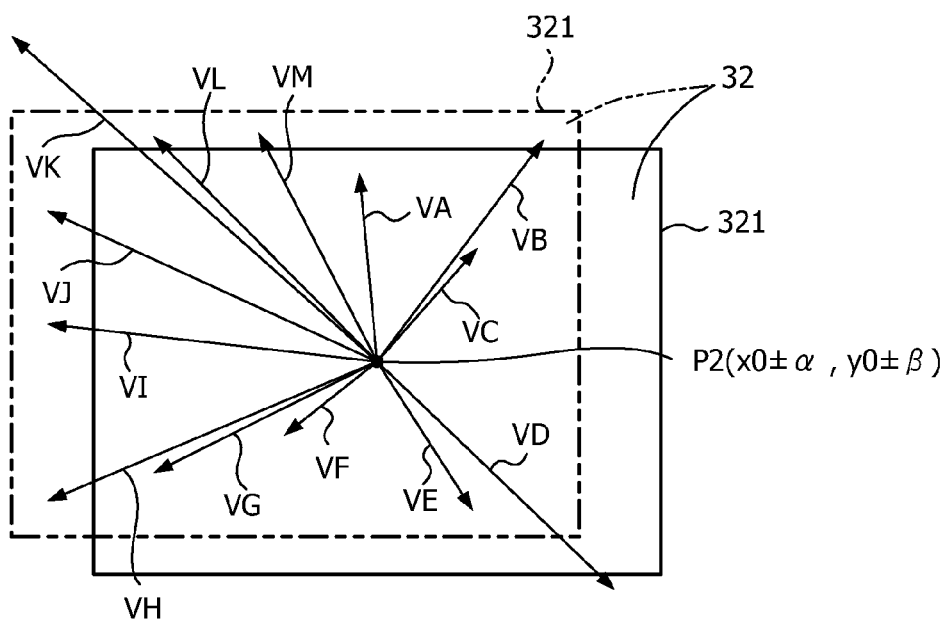

The coordinates of the changed current location (x0±α, y0±β) correspond to the coordinates of the initial point of the vectors VA to VM shown in FIG. 15B. Meanwhile, since the terminal points of the vectors VA to VM are given by shooting location data, the terminal points are not changed and fixed. But, when the initial point or the current location moves, the relative relationships change between the terminal points and the initial point (current location). If the location of the initial point (x0, y0) moves in FIG. 15A, the vectors VA to VM having fixed terminal points change in direction with one exception, as shown in FIG. 15B.

The only one exception is the case that the location P1 moves to the location P2 in the direction or an extension of a specific one of the vectors VA to VM. In this case, the direction of the vector is not changed. For example, when the user moves from the location P1 to the location P2 along the extension of the vector VJ shown in FIG. 15A, the vector VJ changes its length but does not change its direction as shown in FIG. 15B. But the vectors VA to VM excluding the vector VJ change the directions.

As described above, the display controlling unit 59 displays at step S120 the thumbnail images in the directions represented by the vectors VA to VM (that is, the vectors VA1 to VM1) and within the marginal displaying region 311. Therefore, the thumbnail images move within the circular marginal displaying region 311 in response to movement of the user.

For instance, focusing on movement of the thumbnail images "A" and "M", it will be apparent that the thumbnail images "A" to "M" move in the marginal displaying region 311 of the display screen 31 in the counter clockwise direction, as shown in FIG. 14B. Therefore, since the thumbnail images moves in the marginal portion of the display screen 31 in response to movement of the user, the digital camera 1 can give the user visual seasoning.

When the current location moves to the location (x0±α, y0±β), another image data can project from the display target region 33, but since the process at step S118 is repeatedly performed, all the thumbnail images are kept displayed within the marginal displaying region 311 with the displayed size changed.

Second Embodiment

FIG. 16 is a flow chart of operation to be performed in the second embodiment of the invention. Different from the first embodiment, the thumbnail images are displayed in the whole area of the display screen 31 in the second embodiment.

That is, when a specific mode in the shooting mode, that is, for instance, the "GPS shooting mode" is set as in the first embodiment, the controlling unit 60 performs at steps S201 and S202 the same processes as those at steps S101 and S102, setting the imaginary plane 32 having the area 321 and the display target region 33. Then, the display controlling unit 59 starts displaying a live image on the display screen 31 at step S203.

In the second embodiment, the display screen 31 is not sectionalized into the marginal displaying region 311 and the central displaying region 312, and a live image is displayed in the whole area of the display screen 31.

Then, the controlling unit 60 performs at steps S204 to S222 (FIG. 16) the same processes as those at steps S105 to S123 (FIG. 5, in the first embodiment), except a process at step S219.

At step S219, the controlling unit 59 displays the generated thumbnail images at locations indicated by the terminal points on the display screen 31. Therefore, in the second embodiment the thumbnail images "A" to "M" are displayed respectively at locations indicated by coordinates of the terminal points of the vectors VA1 to VM1 in the whole area of the display screen 31.

Figure 17:
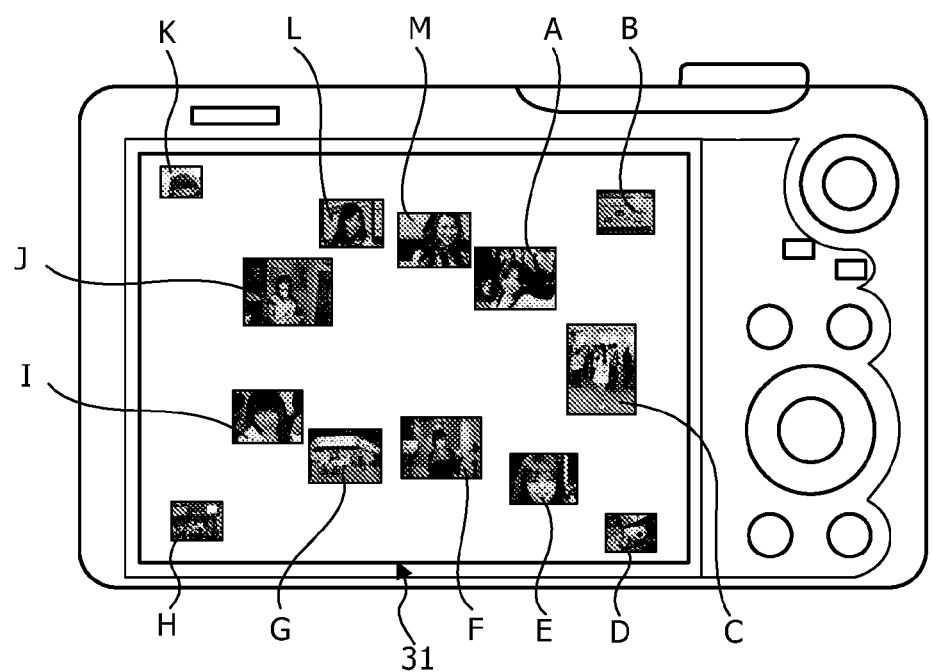
FIG. 17 is a view showing an example of a displaying state on the display screen in the second embodiment.

FIG. 17 is a view showing thumbnail images processed at step S219 and displayed on the display screen 31 in the second embodiment. In FIG. 17, although a live image to be displayed is omitted, the thumbnail images "A" to "M" are displayed on the live image on the display screen 31 in an overlapping manner. In the case that the current location is set at the center of the display screen 31, positions where the thumbnail images "A" to "M" are displayed are determined based on the position-relationships between the current location and the locations where the original images of the thumbnail images "A" to "M" have been shot. Further, in the case that the current location is set at the center of the display screen 31, the sizes of the thumbnail images "A" to "M" correspond respectively to distances between the current location and the locations where the original images of the thumbnail images "A" to "M" have been shot.

Therefore, confirming the thumbnail image, the user can clearly understand at first sight at what location apart from the current location he or she has taken a picture and/or what image he or she has taken, whereby the user can check or shoot all the products on exhibit at the exhibition hall 70 without failure.

When the current location changes from P1 (x0, y0) to P2 (x0±α, y0±β) as described above, the locations and distances of the thumbnail images "A" to "M" seen from the center of the display screen 31 change relatively. Therefore, the locations and display sizes of the thumbnail images "A" to "M" on the display screen 31 change, giving the user visual seasonings.

In the second embodiment, the thumbnail images are displayed on the live image of image data in an overlapping manner, but it is possible to display the thumbnail images and the live image alternately by a switching operation of the user, whereby the thumbnail images can be clearly displayed without hindrance by the live image.

In the description of the first and second embodiments, the thumbnail images are used as the image indexes, which represent contents of image data stored in the external memory 20, but the image index is not limited to the thumbnail image. Icon can be used as the image index.

While the present invention has been described with reference to the preferred embodiments, it is intended that the invention be not limited to by any of the details of the description therein but includes all the embodiments which fall within the scope of the appended claims.

What is claimed is:

1. An image processing apparatus comprising:
    a shooting unit which obtains image data representing an image, the shooting unit including an image pick-up device;
    a displaying unit having a display screen, wherein the displaying unit displays on the display screen an image represented by the image data obtained by the shooting unit;
    a GPS module which functions as a current-location data obtaining unit which successively obtains current-location data, wherein the current-location data indicates a location where the image processing apparatus is presently located; and
    a CPU which functions as:
        an image-location data obtaining unit which obtains, as image-location data, the current-location data obtained by the current-location data obtaining unit, when the shooting unit has obtained the image data;
        a record controlling unit which performs control to store, in a storing unit, the image data and the image-location data associated with each other;
        a first location related data generating unit which generates first location related data indicating a distance between an initial point and a terminal point and a direction of the terminal point viewed from the initial point, wherein the initial point corresponds to a current location indicated by the current-location data obtained by the current-location data obtaining unit and the terminal point corresponds to a location indicated by the image-location data corresponding to the image data;
        a second location related data generating unit which scales down on a scale ratio a distance indicated by the first location related data with the initial point set at a center of a predetermined area set on an imaginary plane, thereby generating second location related data, wherein the scale ratio is given by a ratio of a length of a side in the predetermined area to a length of a corresponding side in a display target region having a same size as the display screen and a same center position as the display screen;
        a data processing unit which converts the second location related data into third location related data with an initial point related to the current-location data always being set at the center position of the display target region, which judges whether or not any outer third location related data is found among the third location related data, the outer third location related data being any third location related data having a terminal point outside the display target region, and which, when outer third location related data is found, reduces a distance of the outer third location related data so that the terminal point of the outer third location related data falls within the display target region and so that the initial point and a direction of the terminal point as viewed from the initial point of the outer third location related data are not changed, thereby generating fourth location related data including both the outer third location related data having the reduced distance and the third location related data that does not have a reduced distance; and
        a display controlling unit which performs control to display image indexes representing contents of the image data stored in the storing unit on the display screen of the displaying unit in accordance with locations indicated by the fourth location related data;
    wherein the data processing unit generates the fourth location related data when the image processing apparatus is operated to display the image indexes in relation to the current-location data obtained by the current-location data obtaining unit.

2. The image processing apparatus according to claim 1, wherein each image index comprises an image represented by the image data.

3. The image processing apparatus according to claim 1, wherein the display controlling unit performs control so as to display the image indexes in accordance with the distances and the directions indicated by the fourth location related data.

4. The image processing apparatus according to claim 1, wherein the display controlling unit performs control so as to sectionalize the display screen of the displaying unit into a marginal displaying region and a central displaying region, and so as to display the image indexes in the marginal displaying region,
    wherein the marginal displaying region comprises a belt-like area provided at a peripheral portion of the display screen, and
    wherein the central displaying region comprises an area surrounded by the marginal displaying region.

5. The image processing apparatus according to claim 4, wherein the display controlling unit performs control so as to display, in the central displaying region, a live image represented by image data which is presently being obtained by the shooting unit.

6. The image processing apparatus according to claim 1, wherein the display controlling unit performs control so as to display each image index at a size corresponding to a distance between a location indicated by the current-location data obtained by the current-location data obtaining unit and a location indicated by the image-location data corresponding to the image data.

7. The image processing apparatus according to claim 1, wherein, when the image indexes are displayed, the display controlling unit judges whether or not any image index overlaps another image index, and, when it is determined that an image index overlaps another image index, the display controlling unit performs control so as to adjust a display position of the overlapping image index so as not to overlap the another image index.

8. The image processing apparatus according to claim 1, wherein the display controlling unit performs control to display the image indexes such that, among the image indexes, image indexes corresponding to the locations indicated by the fourth location related data corresponding to the outer third location related data having the reduced distance are displayed in a manner different from image indexes corresponding to the locations indicated by the fourth location related data corresponding to the third location related data that does not have the reduced distance.

9. The image processing apparatus according to claim 8, wherein the display controlling unit performs control so as to display the image indexes corresponding to the locations indicated by the fourth location related data corresponding to the outer third location related data having the reduced distance at a different size as compared to the image indexes corresponding to the locations indicated by the fourth location related data corresponding to the third location related data that does not have the reduced distance.

10. The image processing apparatus according to claim 9, wherein the different size is a reduced size.

11. A non-transitory computer readable recording medium which is mountable on an image processing apparatus and which stores a program thereon, wherein the image processing apparatus comprises a computer, a storing unit, a shooting unit which obtains image data representing an image and which includes an image pick-up device, a displaying unit which has a display screen and which displays on the display screen an image represented by the image data obtained by the shooting unit, and a GPS module which functions as a current-location data obtaining unit which successively obtains current-location data, wherein the current-location data indicates a location where the image processing apparatus is presently located, and wherein the program is executable to control the computer to perform functions comprising:

obtaining, as image-location data, the current-location data obtained by the current-location data obtaining unit, when the shooting unit has obtained the image data;

storing, in the storing unit, the image data and the image-location data associated with each other;

generating first location related data indicating a distance between an initial point and a terminal point and a direction of the terminal point viewed from the initial point, wherein the initial point corresponds to a current location indicated by the current-location data obtained by the current-location data obtaining unit and the terminal point corresponds to a location indicated by the image-location data corresponding to the image data;

scaling down on a scale ratio a distance indicated by the first location related data with the initial point set at a center of a predetermined area set on an imaginary plane, thereby generating second location related data, wherein the scale ratio is given by a ratio of a length of a side in the predetermined area to a length of a corresponding side in a display target region having a same size as the display screen and a same center position as the display screen;

performing processing so as to (i) convert the second location related data into third location related data with an initial point related to the current-location data always being set at the center position of the display target region, (ii) judge whether or not any not any outer third location related data is found among the third location related data, the outer third location related data being any third location related data having a terminal point outside the display target region, and (iii) when outer third location related data is found, reduce a distance of the outer third location related data so that the terminal point of the outer third location related data falls within the display target region and so that the initial point and a direction of the terminal point as viewed from the initial point of the outer third location related data are not changed, thereby generating fourth location related data including both the outer third location related data having the reduced distance and the third location related data that does not have a reduced distance; and performing control so as to display image indexes representing contents of the image data stored in the storing unit on the display screen of the displaying unit in accordance with locations indicated by the fourth location related data;

wherein the fourth location related data is generated when the image processing apparatus is operated to display the image indexes in relation to the current-location data obtained by the current-location data obtaining unit.

12. The non-transitory computer readable recording medium according to claim 11, wherein the control is performed so as to display the image indexes such that, among the image indexes, image indexes corresponding to the locations indicated by the fourth location related data corresponding to the outer third location related data having the reduced distance are displayed in a manner different from image indexes corresponding to the locations indicated by the fourth location related data corresponding to the third location related data that does not have the reduced distance.

13. The non-transitory computer readable recording medium according to claim 12, wherein the control is performed so as to display the image indexes corresponding to the locations indicated by the fourth location related data corresponding to the outer third location related data having the reduced distance at a different size as compared to the image indexes corresponding to the locations indicated by the fourth location related data corresponding to the third location related data that does not have the reduced distance.

14. The non-transitory computer readable recording medium according to claim 13, wherein the different size is a reduced size.

* * * * *